United States Patent Office 2,815,315
Patented Dec. 3, 1957

2,815,315

ANALGESIC AND ANTIRHEUMATIC PREPARATION

Richard Pottier, Forest-Brussels, Belgium, assignor to Union Chimique Belge Societe Anonyme, Brussels, Belgium, a Belgian company No Drawing. Application January 4, 1954, Serial No. 402,179

Claims priority, application Belgium August 6, 1953

5 Claims. (Cl. 167—77)

The present invention relates to an analgesic and antirheumatic product containing a corticalsteroid and a derivative of 2,3-dihydroxybenzoic acid.

The action of some of the corticalsteroids in the treatment of rheumatism and of related conditions has within recent years been studied by many scientific workers. It is known that in order to obtain a significant therapeutical effect, very strong doses of the active product must be used, at least in the initial treatment. These large doses have the disadvantage of causing secondary reactions which sometimes are alarming and, if some of these reactions do not endanger the life of the patient they do at least endanger his physical and psychical health. Among the corticalsteroids, the most important function of which is the control of the metabolic formation of the carbohydrates, cortisone and similar products such as hydrocortisone which is the same as the hormone named Kendall's compound F are suitable for application in the present invention.

On the other hand it is known that the derivatives of 2,3-dihydroxybenzoic acid have some antirheumatic and analgesic properties. The derivatives to be considered are the salts of this acid and the esters obtained by esterifying both hydroxyl groups of the diphenol with an organic acid of the form RCOOH wherein R represents a hydrogen atom or a hydrocarbon radical. The derivatives may thus be represented by the general formula:

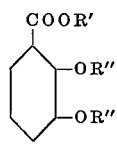

wherein when R' stands for a hydrogen atom, R" stands for a group selected from —OCH, —OCCH₃, —OCC₂H₅, —OCC₆H₅ and wherein when R" stands for a hydrogen atom, R' stands for a radical selected from the group consisting of Na, K, Li and organic bases.

Thus, the 2,3-dihydroxybenzoates of sodium, lithium, potassium, organic amines especially of methylglucamine or of ethanolamine, as well as the diformate, diacetate, dipropionate and dibenzoate of the 2,3-dihydroxybenzoic acid may be used.

It has now been found that with compositions containing corticalsteroids and such derivatives of 2,3-dihydroxybenzoic acid as defined above, a remarkable and unexpected effect of potentiation occurs. The therapeutical effect of these mixtures exceeds by far the effect that may be produced when the constituent components are allowed to act separately. The use of products according to the invention permits a reduction of the quantity of the corticalsteroids used in doses which if used without the addition of a derivative of the 2,3-dihydroxybenzoic acid would be completely ineffective in the initial treatment of chronic rheumatism in the form of chronic polyarthritis in development.

It has been further observed surprisingly that the effect of potentiation does not show up with its full effectiveness unless the composition contains the active components within strictly defined proportions. It has been found that one part of the corticalsteroid is required for about 20 to about 50 parts of the 2,3-dihydroxybenzoic acid which may be in the form of a salt or a diester thereof. Especially remarkable results which could not at all have been foreseen were obtained when one part of the corticalsteroid to about every 33 to about 36 parts of the 2,3-dihydroxybenzoic acid was used. As already indicated above the composition never contains the 2,3-dihydroxybenzoic acid in the free state but always in the form of a salt or of a diester. It is clear that the proportions in the mixture must be calculated with reference to the molecular weight of the 2,3-dihydroxybenzoic acid and of the derivative used.

A consequence of the effect of potentiation of the mixture used in the said proportions is that the quantity of corticalsteroid to be prescribed for treating rheumatism may be substantially reduced. It has now become possible to administer the quarter of the doses previously used with the same therapeutical effect obtained.

Compositions according to the invention may be available as tablets or in the form of a powder. To such compounds may be added any vehicles commonly used, especially if desired, such as to render the preperations effervescent. The compositions remain unchanged for several months provided that the usual precautions are taken for conserving and conveying pharmaceutical specialities of this type.

Patients generally tolerate the new compositions well. They may be applied orally. In certain special cases the compositions may be adapted for subcutaneous injection.

The following examples illustrate the invention but do not limit the invention as defined above in any respect whatever. The parts mentioned are by weight.

*Example 1*

Cortisone _____ 1
Sodium 2,3-dihydroxybenzoate _____ 40

*Example 2*

Hormone Kendall's compound F_____ 1
Methylglucamine 2,3-dihydroxybenzoate_____ 50

*Example 3*

Cortisone _____ 3
Diacetate of 2,3-dihydroxybenzoic acid_____ 160

*Example 4*

Cortisone _____ 1
Diacetate of 2,3-dihydroxybenzoic acid_____ 75

I claim:

1. An analgesic and antirheumatic preparation comprising a corticalsteroid selected from the group consisting of cortisone and hydrocortisone and a derivative of 2,3-dihydroxy benzoic acid having the general formula

wherein R' is a member of the group consisting of hydrogen, sodium, potassium and lithium, and R" is hydrogen when R' is a member of the group consisting of sodium, potassium and lithium, and R" is a member of the group consisting of

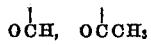

and

when R' is hydrogen, 20 to 50 parts by weight of said derivative of 2,3-dihydroxy benzoic acid, calculated as the free acid, being present for each part by weight of said corticalsteroid.

2. An analgesic and antirheumatic preparation as defined in claim 1 wherein about 33 to 36 parts by weight of said derivative of 2,3-dihydroxy benzoic acid, calculated as the free acid, is present for each part by weight of said corticalsteroid.

3. An analgesic and antirheumatic preparation as defined in claim 2 wherein said corticalsteroid is cortisone and wherein said derivative of 2,3-dihydroxy benzoic acid is the diacetate of 2,3-dihydroxy benzoic acid.

4. Analgesic and antirheumatic preparation comprising about 1 part by weight of cortisone and about 40 parts of sodium 2,3-dihydroxybenzoate.

5. Analgesic and antirheumatic preparation comprising about 1 part by weight of cortisone and about 75 parts of the diacetate of the 2,3-dihydroxybenzoic acid.

References Cited in the file of this patent
UNITED STATES PATENTS 1,889,383   Schmidt _____ Nov. 29, 1932

OTHER REFERENCES

J. A. P. A. (prac. ed.), vol. 13, No. 8, August 1952 pp. 541–544.

Chem. Abstr. citation of Proc. Soc. Exp. Biol. and Med. 84, 38–41 (1953), as shown in C. A. 1954 at page 795g.

Merck Index, 6th ed. "Gentisic Acid," p. 456.

J. A. M. A., vol. 147, No. 16, pp. 1597–1598, Dec. 15, 1951.

La Presse Medicale, 60 No. 63, pp. 1344–1347, Oct. 8, 1952.